April 26, 1949. M. METZIGER 2,468,455
PRODUCTION OF DISODIUM PHOSPHATE DIHYDRATE
Filed Feb. 19, 1945
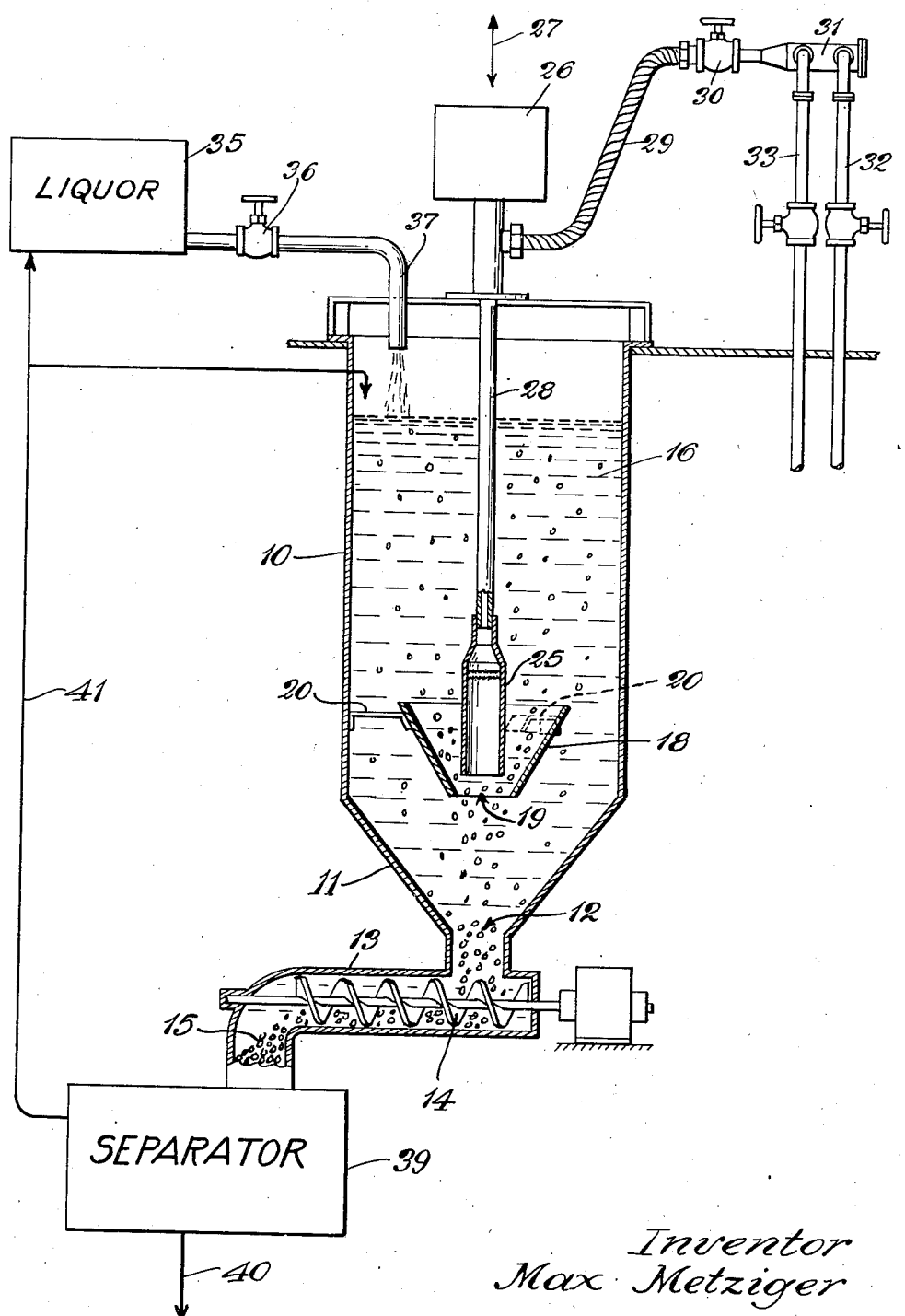
Inventor
Max Metziger
by W. Bartlett Jones,
Attorney.

Patented Apr. 26, 1949

2,468,455

UNITED STATES PATENT OFFICE 2,468,455

PRODUCTION OF DISODIUM PHOSPHATE DIHYDRATE

Max Metziger, Joliet, Ill., assignor to Blockson Chemical Co., Joliet, Ill., a corporation of Illinois Application February 19, 1945, Serial No. 578,673

4 Claims. (Cl. 23—107)

The present invention relates to the preparation of disodium phosphate dihydrate.

It is the general object of the invention to concentrate a solution of disodium phosphate and thereby form the dihydrate salt.

It is a particular object of the invention to heat and evaporate a solution of disodium phosphate by submerged combustion.

Various other and ancillary objects and advantages of the invention will become apparent from the description and explanation hereinafter given, in reference to the accompanying drawing in which:

The figure is a diagrammatic representation of the concentrating vessel and its operation with materials involved.

Disodium phosphate has several hydrated crystal forms and an anhydrous crystal form, all of which can be produced from concentrated aqueous solution. When the temperature of the solution is below 95° C. hydrated crystals form, and in the range from 50° to 95° C. the dihydrate may be formed by cooling the solution with resulting small yield, or by evaporating the solution as in a vacuum. When the temperature is above 95° C., the anhydrous crystal is formed, but only by evaporating the solution. Cooling hot solutions to crystallize therefrom the anhydrous form above 95° C. is impossible, because such form has "inverted solubility." This means that the solubility increases as the temperature decreases, and in the case of disodium phosphate anhydrates the solubility curve shows little change with temperature change.

Where solutes have inverted solubility, difficulty has been experienced in concentrating solutions by contact with heated surfaces, such as vessel walls, or coils, which provide the heat by transfer to the solution. The material tends to accumulate as a cake or covering over the heating surfaces.

One way employed heretofore to concentrate solutions and crystallize out solutes having inverted solubility is by submerbed combustion, that is, a flame is maintained within and in contact with the solution, from which the heat along with waste or combustion gases, is effective to concentrate the solution without such danger of caking. This is described in the U. S. patents to Doennecke et al. No. 2,086,902 and No. 2,159,759, for producing Glauber's salt, which has inverted solubility.

The present invention arose from the application of submerged combustion apparatus of the kind heretofore employed for Glauber's salt, to concentrating an aqueous solution of disodium phosphate. A concentrated solution of disodium phosphate boils at normal atmospheric pressure at about 115° C., and when being concentrated in a particular equipment by submerged combustion of natural gas and air, with the solution above 95° C., as at 98° to 99° C., it gave a crystalline deposit, as intended. According to the known transition point of 95° C., it is to be expected that the anhydrous product would form from a solution above 95° C., but in fact, and unexpectedly and yet unexplained, the dihydrate crystals form.

It is known that by heating the dihydrate crystals in water at temperatures over 95° C., they dehydrate to anhydrous form, not quickly or instantaneously, but over an appreciable period of time. When forming dihydrate crystals by submerged combustion, as above described, they are relatively coarse, about 20 to 40 mesh per inch. It has been found that if the newly formed crystals are removed promptly from contact with mother liquor which is at a temperature over 95° C., and before they have time to dehydrate, an excellent form of dihydrate crystals can be isolated.

Another advantage of the unexpected discovery is that to make the dihydrate salt by a concentration method, the temperature does not need to be maintained between 50° and 95° C., as by the use of vacuum vessels; and ordinary open vessels become useful and more efficient for a concentration process. The solution is, in effect, concentrated by a boiling process.

The dihydrate crystals may be employed in commerce as such, or be used as raw material for conversion to other forms, for example, to sodium pyrophosphate or to anhydrous disodium phosphate as described by Reimann in U. S. No. 1,970,032.

The principle of submerged combustion may be employed in its well-known forms, one of which is illustrated in the drawing.

A cylindrical vessel 10 has a conical bottom 11 with apex opening 12 to which is connected a casing 13 having worm screw conveyor 14 therein for moving out the crystals 15 which settle to the bottom of the cone 11 from the liquor 16 in vessel 10. Above the bottom is a downwardly-pointing conical baffle 18, having an opening 19 at its apex, mounted by suitable supports 20.

A burner 25 is movable substantially axially of cone 18 into and out of the vessel, so that it can be removed for lighting, then while burning be submerged into the liquid. The mechanism is not shown except diagrammatically by the block 26, the arrow 27 indicating directions of the movability. The burner is fed by a hollow supporting stem 28 connected by flexible connection 29 to a control valve 30 and manifold 31. Into the manifold is fed gas containing oxygen, preferably air, by valved supply 32 and a fuel by valved supply 33.

Air is preferred because the nitrogen content acts as a carrier of heat and provides bubbles and a gaseous medium to carry away the water vapor. For like reason, a carbon dioxide generating fuel is preferred to one such as hydrogen. A gaseous fuel in preference to a normally liquid fuel is preferred for mechanical convenience. A mixture of natural gas and air has been very satisfactory. The combustion is preferably such that either gaseous combustion products, or nitrogen, are available for discharge through the solution.

Using air to provide oxygen, the gas which is available for discharge through the solution depends upon the kind of fuel used. The following Table 1 gives roughly the ratio of gas volumes for the different fuels, burned with air in submerged combustion.

Table 1

| | |
|---|---|
| Hydrogen (as a base) | 100 |
| Acetylene | 133 |
| Methane | 145 |
| Propane | 148 |
| Producer gas (30% CO by volume) | 276 |

Roughly, the burning of hydrogen with air gives about 5.8 cu. ft. per 1000 B. T. U., which evaporates approximately 1 lb. of water.

The process may be operated batchwise, but it is preferred to make it continuous. A supply of liquor 35 may be fed in a controlled stream continuously into vessel 10 through valve 36 and line 37.

The crystals formed are promptly removed by any suitable mechanism and where the crystals and the liquor may be subjected to prolonged contact, as may occur in casing 13, there is no danger where the temperature is brought to below 95° C. The need for prompt separation exists only where the dihydrate crystals are subjected for a prolonged time to liquor at above 95° C.

The separation of dihydrate crystals and liquor, is represented graphically by block 39, from which recovered crystals 40 are removed and from which liquor is conveyed by line 41 to supply 35 or back to the vessel 10.

It is preferred to maintain the temperature at above 95° C. However, in operation, the temperature of the liquid may be maintained anywhere from 50° C. to the boiling point at atmospheric pressure. Because of the unexpected formation of dihydrate crystals at temperatures above 95° C., (and because of an expected formation of such at temperatures from 50° to 95° C.), the process becomes a simple one free from any necessity to exercise what one would expect to be a necessary control to limit the temperature to not over 95° C. But when the temperature is above 95° C., then it is necessary to limit the time of contact of the formed dihydrate crystals with liquor of temperature over 95° C.

*Example 1.*—5 gallons of 39° Bé. (90° C.) solution of disodium phosphate are placed in apparatus as illustrated, and natural gas fuel burned with air at the rate of 1 cu. ft. of gas per minute. Crystals of disodium phosphate dihydrate of 20 to 40 mesh form and settle when the temperature reaches 99° C. and the solution attains and maintains at about 99° C. a strength of 55.5° Bé. (99° C.). The crystals are removed from the bottom as formed, centrifuged and dried, and the mother liquor returned to the vessel along with a continuous feed or intermittent replenishment with new 39° Bé. solution, to maintain a substantially uniform working concentration and liquid level.

Numerous changes and modifications may be made without departing from the spirit and scope of the invention as set forth in the accompanying claims.

I claim:

1. The method of forming disodium orthophosphate dihydrate which comprises heating and evaporating water from a body of concentrated solution in water of disodium orthophosphate by submerged combustion therein of a combustible fluid and air mixed and burned beneath the surface of the body of liquid and above the lower level of said body and by distributing the resulting combustion gases for floating upwardly through said body as bubbles, maintaining the temperature of the body of solution at substantially 99° C. with the result that crystals form which are disodium orthophosphate dihydrate, allowing the formed crystals to settle in said body of liquid to a region below the flame, and removing said crystals rapidly from contact with a solution at a temperature above 95° C. before the crystals convert to anhydrous form.

2. The method of forming disodium orthophosphate dihydrate which comprises heating and evaporating water from a body of concentrated solution in water of disodium orthophosphate by submerged combustion therein of a combustible fluid and air mixed and burned beneath the surface of the body of liquid and above the lower level of said body and by distributing the resulting combustion gases for floating upwardly through said body as bubbles, maintaining the temperature of the body of solution in the range from 95° C. to substantially 99° C. with the result that crystals form which are disodium orthophosphate dihydrate, allowing the formed crystals to settle in said body of liquid to a region below the flame, and removing said crystals rapidly from contact with solution at a temperature above 95° C. before the crystals convert to anhydrous form.

3. The method of forming disodium orthophosphate dihydrate which comprises heating and evaporating water from a body of concentrated solution in water of disodium orthophosphate by submerged combustion therein of a combustible fluid and air mixed and burned beneath the surface of the body of liquid and by distributing the resulting combustion gases for floating upwardly through said body as bubbles, maintaining the temperature of the body of solution at substantially 99° C. with the result that crystals form which are disodium orthophosphate dihydrate, and removing said crystals rapidly from contact with solution at a temperature above 95° C. before the crystals convert to anhydrous form.

4. The method of forming disodium orthophosphate dihydrate which comprises heating and evaporating water from a body of concentrated solution in water of disodium orthophosphate by submerged combustion therein of a combustible fluid and air mixed and burned beneath the surface of the body of liquid and by distributing the resulting combustion gases for floating upwardly through said body as bubbles, maintaining the temperature of the body of solution in the range from 95° C. to substantially 99° C. with the result that crystals form which are disodium orthophosphate dihydrate, and removing said crystals rapidly from contact with solution at a temperature above 95° C. before the crystals convert to anhydrous form.

MAX METZIGER.

REFERENCES CITED

The following references are of record in the file of this patent:

UNITED STATES PATENTS

| Number | Name | Date |
|---|---|---|
| 2,159,759 | Doennecke et al. | May 23, 1939 |

FOREIGN PATENTS

| Number | Country | Date |
|---|---|---|
| 308,566 | Great Britain | June 20, 1929 |
| 23,734 | Netherlands | Mar. 16, 1931 |

OTHER REFERENCES

Kobe et al., Ind. & Eng. Chem., vol. 25, Sept. 1933, pages 984–9.